United States Patent [19]

Olaussen et al.

[11] Patent Number: 5,794,291
[45] Date of Patent: Aug. 18, 1998

[54] RAMP

[76] Inventors: Johan Olaussen, Havsteinbakken 7B, N-7021, Trondheim; Erling Nylund, Torvveien 52, N-9990, Batsfjord, both of Norway

[21] Appl. No.: 656,249
[22] PCT Filed: Oct. 19, 1994
[86] PCT No.: PCT/NO94/00170
  § 371 Date: Oct. 17, 1996
  § 102(e) Date: Oct. 17, 1996
[87] PCT Pub. No.: WO95/11142
  PCT Pub. Date: Apr. 27, 1995

[30] Foreign Application Priority Data

Oct. 20, 1993 [NO] Norway ............... 933766

[51] Int. Cl.$^6$ ............... B60P 1/24; B62B 1/10
[52] U.S. Cl. ............... 14/69.5; 414/537; D34/32; 280/8; 280/32
[58] Field of Search ............... 14/69.5, 72.5; 414/537, 462; D34/32

[56] References Cited

U.S. PATENT DOCUMENTS

| | | | |
|---|---|---|---|
| 3,704,794 | 12/1972 | Flamm | 414/537 |
| 3,757,972 | 9/1973 | Martin | 414/537 |
| 3,837,663 | 9/1974 | Ness | 14/69.5 |
| 4,107,932 | 8/1978 | Cantrell | 14/69.5 X |
| 4,329,752 | 5/1982 | Forrest | 14/69.5 |
| 4,845,792 | 7/1989 | Bakula et al. | 14/69.5 |
| 4,979,867 | 12/1990 | Best | 414/537 |
| 5,325,558 | 7/1994 | Labreche | 14/69.5 |
| 5,517,708 | 5/1996 | Baranowski | 14/69.5 |

FOREIGN PATENT DOCUMENTS 956180  10/1974  Canada ............... 14/69.5

*Primary Examiner*—James Lisehora

[57] ABSTRACT

A ramp for loading and unloading snowmobiles and other vehicles from a load bed such as a trailer or transport vehicle. The ramp comprises a pair of longitudinal tracks joined by a plurality of transverse members. Such transverse members are adapted to receive the wheels of the objects being transported or, in the case of snowmobiles, the belt grip thereof. In the case of snowmobiles, the skis of such vehicle are received on the longitudinal tracks. The ramp includes a pair of wheels for use in moving the ramp across the load bed. The wheels are positioned at a location on the ramp corresponding to the center of mass of such ramp when supporting the snowmobile or other such vehicle. The tracks of the ramp are preferably angled upwards to avoid contact with the load bed when being moved across same. The spacing of such tracks is adjustable so as to permit transport of the vehicles having a variety of widths.

16 Claims, 5 Drawing Sheets

RAMP

BACKGROUND OF THE INVENTION

The invention is a ramp for loading objects like vehicles, and especially snowmobiles, on and off trailers and transport-vehicles carrier. All currently known methods for this have major drawbacks. Pulling the snowmobile down from the trailer directly to the ground does not work because the steering runners will get stuck, especially as snowmobile runners slide very poorly on all trailer surfaces. Thus this method only works with a high degree of exertion—totalling the strength of three men as a snowmobile weighs from 190–320 kilos.

Another not very successful method is the use of short skid ramps permanently mounted on rear of the trailer. This method requires two men to push or drag and lift the load. This is not a good technical solution as the mounted ramps are made as short as possible due to wind resistance requirements, weight restrictions and requirements for mounting fixtures. Therefore the angle is extremely steep and the driver must use quite a run up and speed when driving the vehicle up onto the trailer. This has proven to cause material damage and injury and the major problem of the steering runners getting stuck still remains unresolved by this method.

Because there are so many inherent problems with the above-mentioned methods many people prefer to back the trailer up to a snow drift and then pull the vehicle off. This means that a snow bank has to be found with an adequate height, and often when people stop to unload there is a sure recipe for traffic problems. Some people even build platforms in the mountains which are left standing in and out of season marring the natural beauty of the countryside. Using platforms also fails to solve the problem with the steering runners.

SUMMARY OF THE INVENTION

The present invention provides a ramp for loading and unloading objects, such as vehicles, and especially snowmobiles on a load bed such as a transport vehicle or trailer.

In one embodiment, the present invention provides a ramp for loading and unloading a snowmobile from an elevated load bed, the snowmobile having a drive belt and a pair of skis, the ramp comprising a pair of elongate tracks, having front and rear ends, extending along the length of the ramp on opposite sides thereof and adapted to receive the snowmobile skis; a central portion, adapted to receive the snowmobile drive belt, extending between and joining the elongate tracks; each of the tracks including a wheel located at the center of mass of the ramp when supporting the snowmobile, the wheels being coaxial with each other, the wheels permitting the ramp to be rolled along the load bed from a first, snowmobile carrying position, wherein the front and rear ends of the ramp are supported on the bed, and a second, snowmobile loading or unloading position.

The invention also provides for a ramp for loading and unloading a snowmobile from an elevated load bed, the snowmobile having a drive belt and a pair of skis, the ramp comprising a pair of elongate tracks, having front and rear ends, extending along the length of the ramp on opposite sides thereof and adapted to receive the snowmobile skis; a central portion, adapted to receive the snowmobile drive belt, extending between and joining the elongate tracks; a means for moving the ramp on the load bed; the tracks being angled upwards at their front ends.

In a general embodiment, the invention provides a ramp for loading and unloading a vehicle or object from an elevated load bed, said rump comprising a pair of elongate tracks, having front and rear ends, extending along the length of the ramp on opposite sides thereof; a central portion extending between and joining the elongate tracks; each of the tracks including a wheel located at the center of mass of the ramp when supporting the vehicle, the wheels being coaxial with each other; the wheels permitting said ramp to be rolled along the load bed from a first vehicle carrying position, wherein the front and rear ends of the ramp are supported on the bed, and a second, vehicle loading or unloading position.

BRIEF DESCRIPTION OF THE DRAWINGS

These and other features of the preferred embodiments of the invention will become more apparent in the following detailed description in which references made to the appended drawings where.

DETAILED DESCRIPTION OF THE PREFERRED EMBODIMENTS

This new invention will solve the above-mentioned complications and problems when loading and unloading objects such as a snowmobile. The snowmobile can be driven onto the ramp because the belt gains a good grip and because the steering runners glide free of friction onto the tracks. One man can easily operate the ramp with a snowmobile on it as the needed strength is reduced to between 10 and 40 kilos of exertion.

This is achieved because the invention's strategic location of the wheels—approximately 70 cm from the front for a snowmobile—that gives the ramp the balance point which reduces the need for strength to a minimum. The two wheels remove friction when the ramp is wheeled in and out. Two longitudnial tracks are designed so that that the surface of the vehicle's roadway is made uneven with fricton increasing elements such as grooves and steps etc., or, as in this case for the snowmobile, designed so that the ski lies on the aluminum track while the steering runner does not touch it at all as the middle of the roadway is lower than the rest of the track. Two handles situated in the rear give a good grip for lifting. It is the ramp's transverse profiles which give the snowmobile belt its good grip when driving onto the ramp. An angle of 10–25 degrees located in the front at the same point as the wheels, which break the longitudnial tracks, prevents the tracks from touching down while wheeling the ramp. A spike, under each side at the back end of the longitudnial tracks, anchors in the snow to stabilize the ramp when a vehicle is being driven on and off. Two stoppers located just behind the wheels prevent the ramp from sliding forwards when driving up it. The distance between the longitudnial tracks is adjustable, for instance by means of that the transverse profiles is stikking in under the horisontal tracks through quadratic holes. This makes the invention suitabled for objects such as a snowmobile with any width. The two tracks are tapered at the rear so that they will be flush with the ground when driving up it. To further prevent friction with the steering runners when first driving onto the ramp a V-shape has been cut out of the beginning of the two tracks on the rear.

Figure 1:
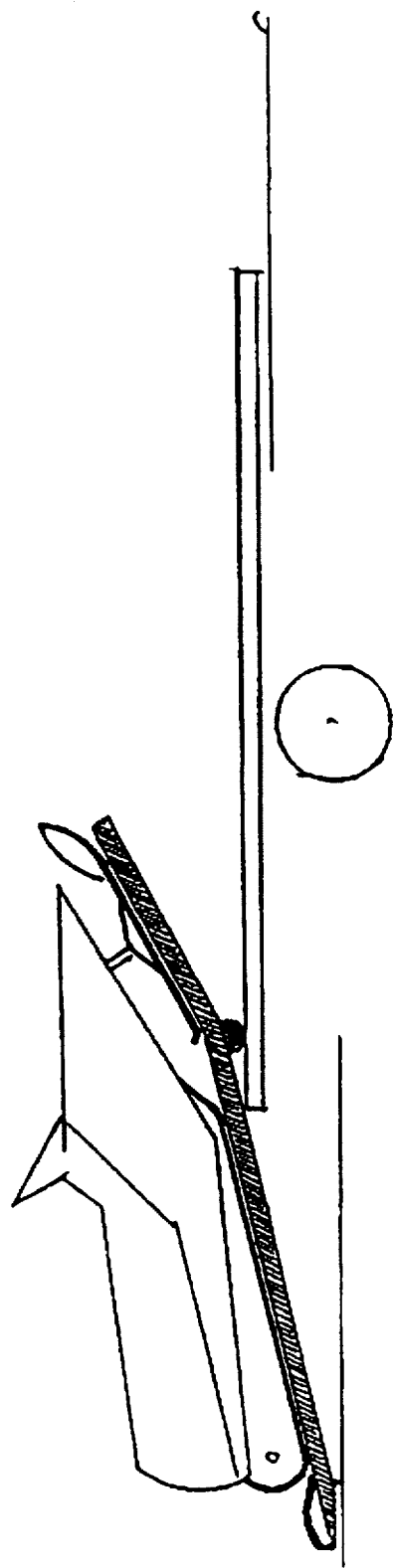
FIG. 1 is a side view of a ramp according to the present invention when in a loading or unloading position.

The ramp is shown in the drawings where FIG. 1 shows the ramp with the snowmobile placed on top in position for drawing the snowmobile to the ground or wheeling onto the trailer. The snowmobile is driven onto the ramp, the handbrake is then put on, and the ramp with the snowmobile is lifted up and pushed inwards. When unloading, after the ramp has been lifted down to the ground, the handbrake is released and the snowmobile will virtually slide off the ramp by means of its own weight. If you want, you can lift the snowmobile the last step down to the ground, or if you pull the handbrake on at this moment you can quite simply drive the car and trailer forward approximately 2.5 to 3 m. The snowmobile will slide to the ground.

Figure 2:
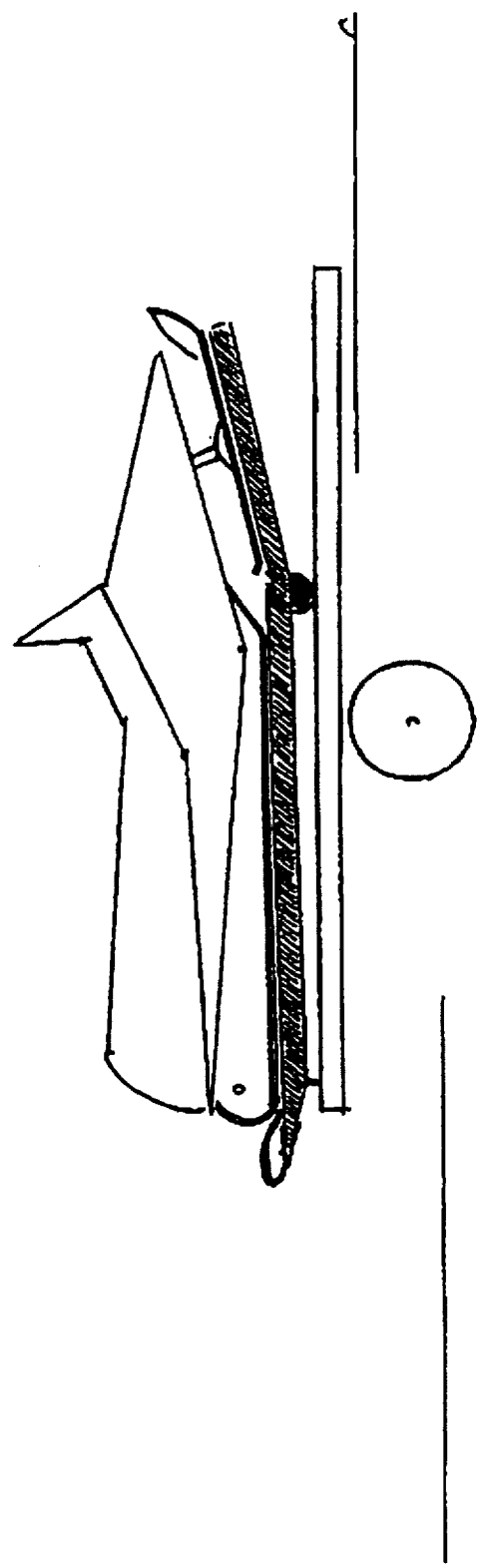
FIG. 2 is a side view of the ramp of FIG. 1 in the transporting position.
Figure 3:
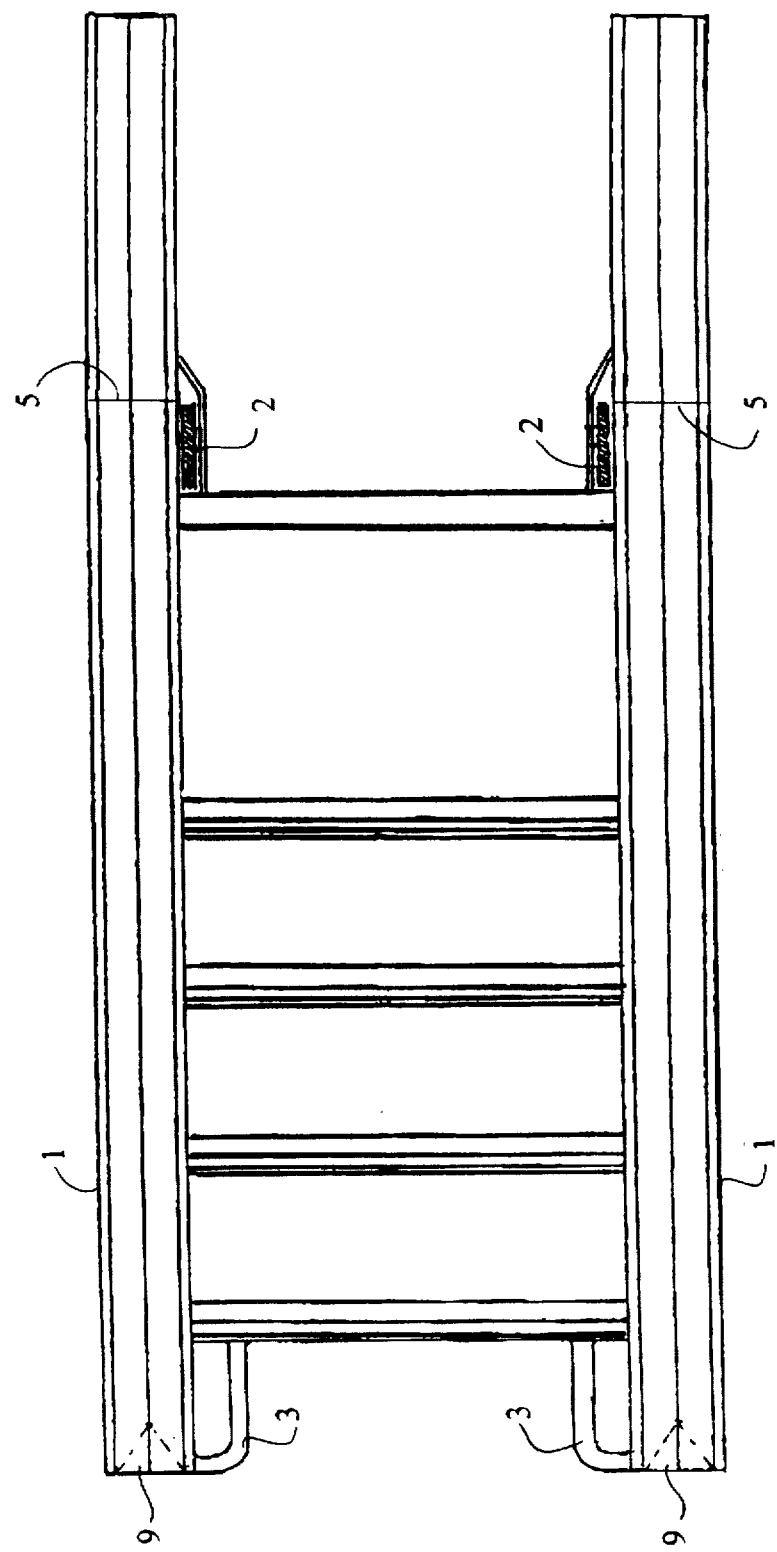
FIG. 3 is a plan view of the ramp.
Figure 4:
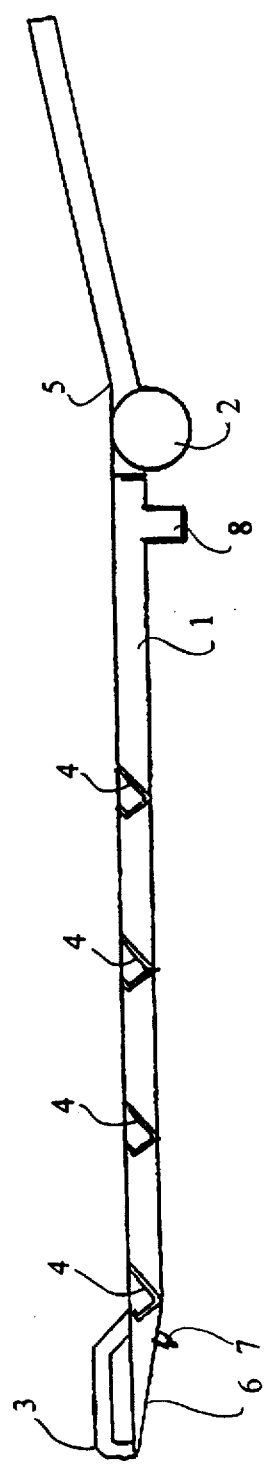
FIG. 4 is a side cross-sectional view of the embodiment shown in FIG. 3.
Figure 5:
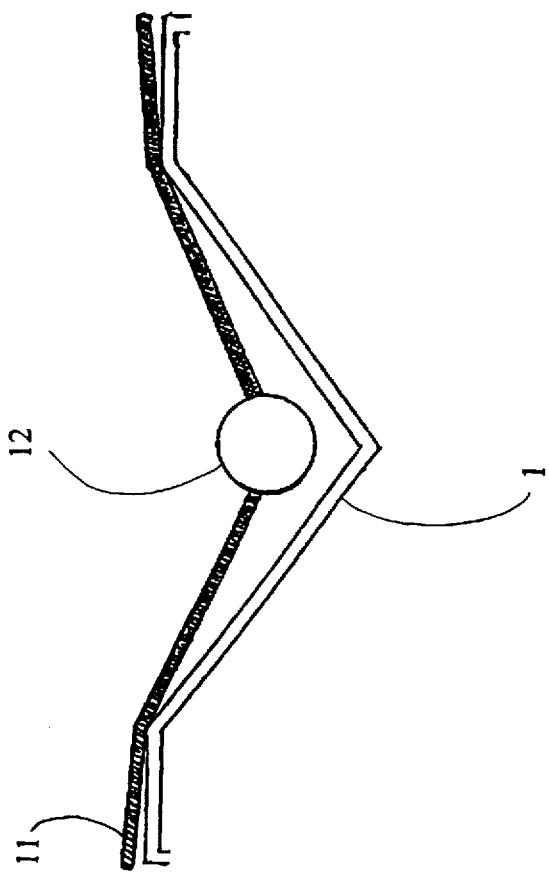
FIG. 5 is an end cross-sectional view of a track of the present invention.

FIG. 2 shows the ramp with the snowmobile ready for transport. FIG. 3 shows the ramp from an overhead view. FIG. 4 shows a side view of the ramp, while FIG. 5 shows a cross-section of the snowmobile ski and the positioning of the runners in the track.

Aluminum is a very suitable material for the ramp when loading snowscooters because of its weight, strength and corrosive resistance. Plastic is a proper material for use on wheels.

I claim:

1. A ramp for loading and unloading a snowmobile from an elevated load bed, said snowmobile having a drive belt and a pair of skis, said ramp comprising:
    a pair of elongate tracks, having front and rear ends, extending along the length of said ramp on opposite sides thereof and adapted to receive said snowmobile skis;
    a central portion, adapted to receive said snowmobile drive belt, extending between and joining said elongate tracks;
    each of said tracks including a wheel located at the center of mass of the ramp when supporting said snowmobile, said wheels being coaxial with each other;
    said wheels permitting said ramp to be rolled along said load bed from a first, snowmobile carrying position, wherein the front and rear ends of said ramp are supported on said bed, and a second, snowmobile loading or unloading position.

2. A ramp as claimed in claim 1 wherein said tracks are angled upwards at their front ends, said angles commencing at said wheels.

3. A ramp as claimed in claim 2 wherein the rear ends of said tracks are wedge shaped thereby permitting said rear end to be flush with the ground when said ramp is in said second position.

4. A ramp as claimed in claim 3 wherein the rear ends of said tracks include anchors to secure said ramp on the ground when in said second position.

5. A ramp as claimed in claim 4 wherein said central portion comprises a plurality of beams extending between said tracks.

6. A ramp as claimed in claim 5 further including means for adjusting the spacing between said tracks thereby permitting use of said ramp with a variety of snowmobile sizes.

7. A ramp as claimed in claim 6 wherein said tracks have a concave cross section for receiving said snowmobile skis.

8. A ramp as claimed in claim 7 further including a means for preventing said ramp from rolling forward on said load bed when said ramp is in said second position.

9. A ramp for loading and unloading a snowmobile from an elevated load bed, said snowmobile having a drive belt and a pair of skis, said ramp comprising:
    a pair of elongate tracks, having front and rear ends, extending along the length of said ramp on opposite sides thereof and adapted to receive said snowmobile skis;
    a central portion, adapted to receive said snowmobile drive belt, extending between and joining said elongate tracks;
    a means for moving said ramp on said load bed; said tracks being angled upwards at their front ends.

10. A ramp for loading and unloading a vehicle or object from an elevated load bed, said ramp comprising:
    a pair of elongate tracks, having front and rear ends, extending along the length of said ramp on opposite sides thereof;
    a central portion extending between and joining said elongate tracks;
    each of said tracks including a wheel located at the center of mass of the ramp when supporting said vehicle, said wheels being coaxial with each other;
    said wheels permitting said ramp to be rolled along said load bed from a first, vehicle carrying position, wherein the front and rear ends of said ramp are supported on said bed, and a second, vehicle loading or unloading position.

11. A ramp as claimed in claim 10 wherein said tracks are angled upwards at their front ends, said angles commencing at said wheels.

12. A ramp as claimed in claim 11 wherein the rear ends of said tracks are wedge shaped thereby permitting said rear end to be flush with the ground when said ramp is in said second position.

13. A ramp as claimed in claim 12 wherein the rear ends of said tracks include anchors to secure said ramp on the ground when in said second position.

14. A ramp as claimed in claim 13 wherein said central portion comprises a plurality of beams extending between said tracks.

15. A ramp as claimed in claim 14 further including means for adjusting the spacing between said tracks thereby permitting use of said ramp with a variety of vehicle sizes.

16. A ramp as claimed in claim 15 further including a means for preventing said ramp from rolling forward on said load bed when said ramp is in said second position.

\* \* \* \* \*